Patented Sept. 4, 1945

2,384,053

UNITED STATES PATENT OFFICE 2,384,053

MANUFACTURE AND USE OF NEW AMINE SALTS

Edward Boaden Thomas, Spondon, near Derby, England, assignor to Celanese Corporation of America, a corporation of Delaware No Drawing. Application May 13, 1941, Serial No. 393,202. In Great Britain June 4, 1940

9 Claims. (Cl. 252—8.75)

This invention relates to the manufacture of new salts of organic amino compounds. The new salts are of value as dispersing, washing and wetting agents, and for incorporation in textile materials to modify the properties of the latter. They are of particular value for reducing the tendency of textiles of low electrical conductivity, e. g. natural silk or cellulose ester or ether artificial silk, to acquire and retain electric charges. The invention includes both the manufacture of the new salts, compositions of matter comprising the new salts, and textile and other materials carrying the new salts.

The new salts are salts of an amine, the said amine containing at least two aliphatic amino groups, with an organic acid which can be regarded as derived from a polybasic inorganic acid (which term is used as including a dibasic acid) by replacing an acidic hydrogen or an acidic hydroxyl group by an organic radicle. Organic sulphonic acids and acid sulphuric, phosphoric, thiophosphoric and phosphorous esters of organic hydroxy compounds are acids of the foregoing type.

The new salts can be derived from various amines containing at least two aliphatic amino groups. Examples of such amines are alkylene diamines, e. g., ethylene diamine, alpha-beta- and alpha-gamma-diamino-propane, hexamethylene diamine and 1:4-diamino-cyclohexane. The amino groups may be primary, secondary or tertiary, or one amino group may be of one of these kinds, and one of another of these kinds. For example, suitable amines are the N-mono-substituted and the symmetrical and unsymmetrical N.di-substituted derivatives of the foregoing diamines wherein the substituents are alkyl, aralkyl or cyclo-alkyl groups, e. g. mono-ethyl, monobenzyl or monocyclohexyl ethylene diamine or symmetrical or unsymmetrical di-methyl, diethyl, or dibenzyl ethylene diamine. By the term "aliphatic amino group" is meant an amino group which is not directly attached to an aromatic nucleus.

The organic acids of which the new compounds are salts can, as indicated above, be organic sulphonic acids or acid sulphuric or acid phosphoric esters of organic hydroxy compounds. Of particular value are the salts derived from aliphatic sulphonic acids and sulphuric or phosphoric esters of aliphatic or cyclo-aliphatic alcohols, more particularly such alcohols as contain eight or more carbon atoms and especially such as contain twelve or more carbon atoms. Such sulphuric or phosphoric esters can be those of either saturated or unsaturated alcohols. Mention may be made of the sulphuric and phosphoric esters of octyl, lauryl, cetyl, stearyl and other higher saturated fatty alcohols, and the esters obtainable from oleyl and other unsaturated higher fatty alcohols by treating the unsaturated alcohol with concentrated sulphuric acid in presence or not of acetic or other organic acid anhydride, or with fuming sulphuric acid, chlorsulphonic acid, or sulphur trioxide in presence or not of an organic base or an ether. Further, sulphonic acids corresponding with the foregoing alcohols can be used, e. g., lauryl, cetyl and stearyl sulphonic acids. Again, acid sulphates or phosphates of cyclohexanol or methyl cyclohexanols can be used.

Other acids which can be employed are those obtainable by the action of sulphonating agents, e. g., concentrated or fuming sulphuric acid, or chlorsulphonic acid, on animal or vegetable fats or oils or on mineral oils, including such fats or oils as contain unsaturated linkages. The acids of Turkey red oil (obtained by action of sulphuric acid on castor oil) may be used for instance.

The salt should preferably contain, either in the acid or in the base from which it is derived, a group comprising several carbon atoms, e. g., six or more, united one to another of the group. The presence of a chain of several carbon atoms, e. g., 8, 10, 12 or more carbon atoms, is particularly advantageous. Especially useful products are those derived from, on the one hand, acid sulphuric or acid phosphoric esters of aliphatic alcohols containing a chain of twelve or more carbon atoms, and, on the other hand, from an unsymmetrical N-dialkyl ethylene diamine.

The manufacture of the new salts can be effected in various ways. For example the free acid and free amine may be allowed to react, if desired in presence of a diluent, e. g. ethyl alcohol or acetone. If the acid employed is contaminated with an inorganic salt, such as sodium sulphate, the latter will remain undissolved by the alcohol or acetone and can be eliminated by filtration. From the solution the desired salt of the acid with the amine can then be isolated, e. g. by evaporation of the acetone or alcohol.

A second method of making the new organic amine salts is by double decomposition between a salt of the amine, e. g. the sulphate or hydrochloride or other salt of a strong mineral acid, and a salt of the acid, e. g., the sodium salt. In this case it is advantageous to effect the reaction in a liquid which dissolves the required salt of the amine, but not the second salt produced as a by-product of the double decomposition.

As mentioned above the acids can be organic sulphonic acids or acid esters of aliphatic or cyclo-aliphatic alcohols with polybasic inorganic acids. Such acids are commonly available as products containing free inorganic polybasic acids, for example the alcohol acid sulphate products obtained by the action of sulphuric acid, sulphur trioxide, fuming sulphuric acid, or chlorsulphonic acid on the alcohol. When such products are available as the source of the acid a convenient variant of the above mentioned methods of preparing the salts of the amines is to act upon one of the said products containing both free inorganic polybasic acid and organic sulphonic acid, alcohol acid sulphate or the like, with both the amine and an inorganic alkali. For example a product containing both sulphuric acid and lauryl acid sulphate or other alcohol acid sulphate can be allowed to react with both the amine, (e. g., N-diethyl-ethylene diamine) and alkali metal carbonate or hydroxide and the desired salt of the amine separated from the alkali metal sulphate formed.

Another variant of these methods is to mix the amine with a salt of the acid (e. g., the sodium or other metal salt or the ammonium salt), and add a strong acid such as sulphuric or hydrochloric or other strong mineral acid. Thus, the sodium salt of the acid, together with the requisite proportion of amine, may be suspended in ethyl alcohol or acetone and sulphuric acid added, preferably in quantity slightly less than that equivalent to the sodium salt of the acid. Sodium sulphate is thereby formed and can readily be separated by filtration from the alcohol or acetone solution of the desired salt of the organic acid with the amine.

A further, though in general less useful variant, is to mix the acid and a salt of the amine (e. g., the sulphate or hydrochloride) and then to add a strong alkali, e. g., caustic soda or caustic potash.

As a general rule the products can be purified by solution in a solvent, e. g., alcohol or acetone, followed by filtration and evaporation of the solvent.

A convenient method of making the N-diethyl-ethylene-diamine salt of oleyl sulphate is to suspend the sodium salt of oleyl sulphate in about 10 times its weight of methylated spirit which has been dried over lime and add thereto a quantity of the diethyl-ethylene-diamine about 15% in excess of that theoretically equivalent to the sodium salt and a quantity of sulphuric acid about equivalent to the sodium salt. The mixture is boiled under reflux for a short time, cooled, filtered from sodium sulphate and the solution evaporated to dryness, preferably under vacuum.

The N-diethyl-ethylenediamine salt of lauryl sulphate can be prepared similarly.

The sodium salts of oleyl sulphate and similar sodium salts of sulphates of higher alcohols, such as are normally available, usually contain sodium sulphate or similar inorganic salt. This does not interfere materially with the carrying out of the foregoing process, since the inorganic salt is eliminated by the filtering process together with that produced in the course of reaction.

As mentioned previously the new organic salts are of value as dispersing, washing and wetting agents. They are, however, of particular value for application to filaments, foils or films of cellulose acetate, or other cellulose esters or ethers, since they reduce the tendency of these materials to acquire and retain electric charges. If these materials acquire and retain electric charges many of the textile operations which the materials are normally required to undergo are rendered very difficult. Examples of such operations are knitting and the working up into yarn of staple fibre composed of short lengths of filaments of cellulose acetate or other cellulose ester or ether. For reducing the tendency of cellulose ester or ether materials to electrify, the new organic salts are conveniently applied thereto in the form of solutions, for example in water or other suitable liquid. The materials can, for example, be moistened with these solutions in any convenient manner and thereafter dried in order to leave a deposit of the organic salt on the material. For instance, continuous filament yarn in hank or package form may be immersed in the solutions, excess liquid removed by centrifuging or other suitable means, and the material dried. Again, cellulose acetate or other cellulose ester or other staple fibre may be similarly treated or it may be sprayed with a solution of the organic salt. By this treatment the subsequent working up of the staple fibre into a sliver, yarn or other form, can be greatly facilitated due to the little tendency of the treated material to become electrified.

A merit of the new organic salts of the present invention is that they are soluble in many of the oils commonly used for the lubrication of textile materials in order to facilitate manipulation of the latter. Such lubrication is, for instance, very desirable indeed in the case of dry-spun cellulose acetate yarn immediately after its production and prior to its being wound or twisted and wound. Again, cellulose acetate yarn intended for knitting purposes must be suitably lubricated if its knitting properties are to be satisfactory. By using for the lubrication a solution of one of the compounds of the present invention in the lubricating oil, the tendency of the material to develop electric charges is simultaneously reduced. The lubricating oils thus employed may be, for instance, animal or vegetable oils, whether of the non-drying type, for example coconut oil, or of the semi-drying type, for example olive oil, and esters of polymerized and/or oxidised unsaturated fatty acids, especially those of monohydric alcohols, e. g. cyclohexanol or methyl cyclohexanol. An example of the last mentioned type of lubricant is the polymerised and oxidised oleic ester of methylcyclohexanol. Lubricants comprising mineral oils may also be used in conjunction with the amine salts of the present invention.

The incorporation of the amine salt with a lubricating oil can frequently be facilitated by the simultaneous presence of a fatty acid or aliphatic or cycloaliphatic alcohol containing at least 6 carbon atoms. Fatty acids and aliphatic alcohols containing 12 or more carbon atoms, e. g. oleic acid, oleyl alcohol, and lauryl alcohol, are very suitable, also cyclohexanol and methylcyclohexanols. By the use of such compounds as assistants it is often possible to incorporate in the oil a greater proportion of the amine salt than would otherwise be possible.

It will be appreciated therefore that in the production of a lubricant containing one of the new amine salts by starting from a higher fatty alcohol, converting the latter to say the acid sulphuric or acid phosphoric ester, forming the amine salt of the latter and incorporating the salt with a lubricating oil, it is unnecessary to ensure a complete conversion of the alcohol into the acid ester. It is, in fact, convenient to carry out the esterification of the higher fatty alcohol so that part remains unesterified in the product at the close of operations necessary.

When solutions of the amine salts in lubricating oils are required it is often convenient to incorporate the oil with the crude preparation of the amine salt still containing inorganic salts. The amine salt can thus be dissolved in the oil and the inorganic salts separated by filtration. The use of a separate solvent, such as alcohol or acetone, can thus be avoided. For example oleyl alcohol can be partly sulphated by warming with sulphuric acid, free sulphuric acid neutralised with lime or other inorganic alkali, sufficient amine added to combine with the oleyl sulphate present, the lubricating oil added, and the mixture filtered to separate the oil solution of the free oleyl alcohol and the amine salt of the oleyl sulphate from inorganic sulphate.

The invention includes compositions containing the new amine salts together with a lubricating oil, or together with a fatty acid or aliphatic or cycloaliphatic alcohol containing at least 6 carbon atoms, and specifically compositions containing the new amine salts together with both a lubricating oil and a fatty acid or aliphatic or cycloaliphatic alcohol containing at least 6 carbon atoms.

The invention is illustrated by the following examples, the "parts" referred to being parts by weight.

Example 1

37 parts of a product consisting of sodium lauryl sulphate (29 parts) and lauryl alcohol (8 parts) are mixed with 200 parts of methylated spirit. To the stirred mixture is added in succession 13 parts of an aqueous solution of N-diethylethylene-diamine (50% strength) and 5 parts of sulphuric acid (97% strength). The whole is then boiled under a reflux condenser for 2 hours, filtered, and the methylated spirit removed by distillation.

The product consists substantially of the N-diethyl-ethylene-diamine salt of lauryl acid sulphate together with some lauryl alcohol and is soluble in a mixture of 4 parts of paraffin oil (viscosity 120 Redwood), 2 parts of coconut oil, and 1 part of cyclohexanol. Solutions containing up to 20 per cent of the salt can be obtained. They are valuable for application to cellulose acetate filaments, e. g. in the form of staple fibre or yarn, in order to lubricate the same and reduce their tendency to acquire and retain electric charges. They may be applied for instance in an amount of from 5 to 20% base on the weight of the said filaments.

Example 2

200 parts of lauryl alcohol are mixed with 90 parts of concentrated sulphuric acid and the mixture maintained at 50–60° C. for two hours. The product is cooled to below 30° C. and there is added 65 parts of a 50% aqueous solution of N-diethylethylene-diamine, 41 parts of anhydrous sodium carbonate, and 330 parts of water, the latter being added last and slowly. If the mixture is not neutral or slightly alkaline to litmus sufficient of the diethyl-ethylene diamine is added to make the mixture neutral or slightly alkaline. The mixture is then heated and water distilled off under a pressure of 30 millimetres of mercury until the temperature reaches 110° C. 600 parts of methylated spirit is then added and the mixture boiled under reflux for two hours. After filtering off the undissolved material the spirit is distilled off, finally under vacuum at a temperature not exceeding 110° C.

The product consists of the diethyl-ethylene-diamine salt of lauryl sulphate together with some free lauryl alcohol. It is readily soluble in mixtures of mineral oil with coconut oil, with or without a small proportion of cyclohexanol.

Example 3

200 parts of lauryl alcohol are mixed with 100 parts of concentrated sulphuric acid and the mixture maintained at 60–70° C. for 2 hours. After cooling to below 30° C. there are added 95 parts of a 50% aqueous solution of N-diethyl-ethylene-diamine and 76 parts of a 40% aqueous solution of caustic soda. The mixture is stirred and maintained below 30° C. during the addition. Then 950 parts of paraffin (viscosity 120 Redwood), 300 parts of coconut oil, and 150 parts of cyclohexanol are added and the whole heated for two hours at 95° C. Neutrality or slight alkalinity to litmus is maintained during this time by addition of N-diethyl-ethylene-diamine as necessary. On standing the product separates into two layers the lower being sodium sulphate and water and the upper a solution of the N-diethyl-ethylene-diamine salt in the oil mixture. It is a valuable lubricant for cellulose acetate textile filaments, for example in the form of staple fibre, staple fibre yarn, or continuous filament yarn.

The N-diethyl-ethylene-diamine referred to in the above examples 1 to 3 is a product consisting substantially of a mixture of symmetrical and unsymmetrical N-diethyl-ethylene-diamine and obtained by ethylating ethylene diamine with ethyl chloride in presence of alcohol. Other amine products consisting substantially of a mixture of a symmetrical N-dialkyl or N-di-aralkyl-ethylene diamine with the corresponding unsymmetrical compound can be employed similarly. Again the above amine mixtures can be employed for the preparation of amine salts of the type contemplated in accordance with the invention but derived from acids other than the lauryl sulphate mentioned in the above examples. For instance salts of the said amine mixtures with oleyl-sulphate can be produced.

Having described my invention, what I desire to secure by Letters Patent is:

1. A composition suitable for dressing textile materials, said composition comprising a lubricating oil and a salt of diethyl-ethylene-diamine with an acid sulphate of an aliphatic alcohol containing at least 12 carbon atoms.

2. A composition suitable for dressing textile materials, said composition comprising a mineral lubricating oil and a salt of diethyl-ethylene-diamine with an acid sulphate of an aliphatic alcohol containing at least 12 carbon atoms.

3. A composition suitable for dressing textile materials, said composition comprising a mineral lubricating oil and a salt of diethyl-ethylene-diamine with the acid sulphate of lauryl alcohol.

4. A composition suitable for dressing textile materials, said composition comprising a mineral lubricating oil, cocoanut oil, cyclohexanol, and a salt of diethyl-ethylene-diamine with the acid sulphate of lauryl alcohol.

5. Textile fibres dressed with a composition comprising a lubricating oil and a salt of diethyl-ethylene-diamine with an acid sulphate of an aliphatic alcohol containing at least 12 carbon atoms.

6. Cellulose ester fibres dressed with a composition comprising a lubricating oil and a salt of diethyl-ethylene-diamine with an acid sulphate of an aliphatic alcohol containing at least 12 carbon atoms.

7. Cellulose acetate fibres dressed with a composition comprising a mineral lubricating oil and a salt of diethyl-ethylene-diamine with an acid sulphate of an aliphatic alcohol containing at least 12 carbon atoms.

8. Cellulose acetate fibres dressed with a composition comprising a mineral lubricating oil and a salt of diethyl-ethylene-diamine with the acid sulphate of lauryl alcohol.

9. Cellulose acetate fibres dressed with a composition comprising a mineral lubricating oil, cocoa-nut oil, cyclohexanol, and a salt of diethyl-ethylene-diamine with the acid sulphate of lauryl alcohol.

EDWARD BOADEN THOMAS.